United States Patent
Wang et al.

(10) Patent No.: US 12,269,295 B2
(45) Date of Patent: Apr. 8, 2025

(54) VARIABLE THICKNESS CARBON FIBER COMPOSITE RIM STRUCTURE AND PLY DESIGN METHOD THEREOF

(71) Applicant: Jilin University, Changchun (CN)

(72) Inventors: Dengfeng Wang, Changchun (CN); Wenchao Xu, Changchun (CN); Yong Wang, Changchun (CN); Jingbo Gao, Changchun (CN)

(73) Assignee: Jilin University, Changchun (CN)

( * ) Notice: Subject to any disclaimer, the term of this patent is extended or adjusted under 35 U.S.C. 154(b) by 940 days.

(21) Appl. No.: 17/304,417

(22) Filed: Jun. 21, 2021

(65) Prior Publication Data

US 2022/0009280 A1   Jan. 13, 2022

(51) Int. Cl.
  *B60B 5/02*     (2006.01)
  *B60B 21/02*    (2006.01)

(52) U.S. Cl.
  CPC .............. *B60B 5/02* (2013.01); *B60B 21/023* (2013.01); *B60B 2360/3412* (2013.01); *B60B 2360/3416* (2013.01); *B60B 2900/111* (2013.01); *B60B 2900/311* (2013.01)

(58) Field of Classification Search
  CPC ........... B32B 17/067; B32B 5/02; B32B 3/00; B32B 9/047; B32B 33/00; B60B 2360/3412; B60B 2360/3416; B60B 2900/311; B60B 21/023; B60B 5/02
  See application file for complete search history.

(56) References Cited

U.S. PATENT DOCUMENTS

| | | | | |
|---|---|---|---|---|
| 4,294,490 A * | 10/1981 | Woelfel | ................. | B29C 53/60 428/113 |
| 4,376,749 A * | 3/1983 | Woelfel | ................. | B29C 70/003 156/184 |
| 4,749,235 A * | 6/1988 | McDougall | ............... | B60B 5/02 428/113 |
| 9,555,664 B2 * | 1/2017 | Werner | ..................... | B60B 5/02 |
| 10,723,172 B2 * | 7/2020 | Walls-Bruck | ......... | B60B 21/102 |
| 2010/0090518 A1 * | 4/2010 | Schiers | ................. | B60B 21/026 156/154 |
| 2014/0333121 A1 * | 11/2014 | Hufenbach | ............. | B60B 3/044 156/196 |
| 2014/0333122 A1 * | 11/2014 | Werner | ................... | B29C 70/34 301/95.102 |
| 2016/0303902 A1 * | 10/2016 | Snyder | ................. | B60B 21/023 |

(Continued)

FOREIGN PATENT DOCUMENTS

JP         59032503 A  *  2/1984  ............... B60B 5/02
WO   WO-2019201510 A1  * 10/2019  ............ B60B 21/02

*Primary Examiner* — Kip T Kotter
(74) *Attorney, Agent, or Firm* — AVEK IP, LLC

(57) ABSTRACT

A variable thickness rim structure made of carbon fiber composite includes an outer ply block, that is paved as an outer side of the rim structure; an upper ply block, that is paved as an upper part of an inner side of the rim structure; a lower ply block, that is paved as a lower part of the inner side of the rim structure; a filling ply block, that is paved among the outer ply block, the upper ply block, and the lower ply block, where a first end of the upper ply block and a first end of the lower ply block extend inwards to form an annular connecting flange; a second end of the upper ply block extends upwards and a second end of the lower ply block extends downwards to form a rim ring together with the outer ply block.

10 Claims, 11 Drawing Sheets

(56) References Cited

U.S. PATENT DOCUMENTS

2017/0228473 A1\* 8/2017 Kang ..................... G06F 30/00
2020/0247177 A1\* 8/2020 Werner ..................... B60B 5/02
2020/0406672 A1\* 12/2020 Denmead ................ B60B 21/04

\* cited by examiner

VARIABLE THICKNESS CARBON FIBER COMPOSITE RIM STRUCTURE AND PLY DESIGN METHOD THEREOF

CROSS REFERENCE TO RELATED APPLICATION

This patent application claims the benefit and priority of Chinese Patent Application No. 202010310380.4 filed on Apr. 20, 2020, the disclosure of which is incorporated by reference herein in its entirety as part of the present application.

TECHNICAL FIELD

The present disclosure relates to a variable thickness rim structure made of carbon fiber composite and a ply design method thereof, and belongs to the field of structural designs of carbon fiber composite parts of vehicles.

BACKGROUND ART

Carbon fiber composites are polymer materials which take carbon fibers as a main body and resin as a matrix. They have excellent comprehensive performance, such as low density, high specific strength, high specific stiffness, good fatigue resistance, impact resistance, corrosion resistance, and damping shock performance, and low noise, and are gradually promoted and applied on vehicle bodies and chassis structural components and parts. In a vehicle driving system, wheels are important bearing parts and safety parts, and belong to unsprung mass. In work, wheels move in all directions and rotate around the centers thereof. Previous studies have shown that lightweight and energy-saving effects of the wheels are 3 to 6 times that of ordinary moving parts on vehicles. In a service process, the wheels have to bear various complex dynamic loads of bending, torsion, shear, impact, and the like along the longitudinal direction, vertical direction, and lateral directions simultaneously, and the wheels have to be exposed to the external environment for a long time. Therefore, the good fatigue resistance, corrosion resistance, and impact resistance of the wheels are desirable. In the aspect of operation stability and smoothness of vehicles, the better the damping shock performance of the rims of the vehicle wheels is, the higher the operation stability and smoothness of the whole vehicles is. Therefore, the application of carbon fiber composites in the design of wheel structures can take full advantages of unique performance advantages of the carbon fiber composites, which can realize the lightweight of the wheels, and significantly improve the comprehensive performance of the wheels and the whole vehicles.

At present, the carbon fiber composites have been gradually applied in some luxury cars and supercars. However, their structural design methods and production processes are not mature yet. Some inventors have made efforts in the structural design and manufacture of carbon fiber composite wheels. At present, most of the patents and references related to the structural design and manufacture of the carbon fiber composite wheels aim at integrated wheel structures. The invention patent with Chinese Patent Application No. 201710879726.0 discloses a method for preparing a carbon fiber composite wheel by adopting an integrated molding process. The invention patent with Chinese Patent Application No. 201710366507.2 discloses an integrally formed full carbon fiber hub. The patent designs a hollow full carbon fiber hub structure, which makes the whole hub have high strength, and reduce the weight. According to the development route of China's energy-saving and new energy vehicles, with the development of lightweight materials, structures, and technologies of the vehicles, metal-carbon fiber composite assembled wheels with better performance are a new round of research and development hotspots and difficulties. Compared with integrated wheels, the assembled wheels can take full advantages of unique performance and manufacturing advantages of different materials, so that the comprehensive performance of the wheels is better, the manufacturing process is simpler, and the production efficiency is higher. Meanwhile, the assembled wheels have good maintenance economy. Certain components of rims or spokes can be replaced separately after being damaged. They are low in maintenance and use cost, and have a broad application prospect in future market. In a split wheel structure, a rim is of an axisymmetric revolution body structure, and which is more suitable to be subjected to structural plying or winding design with the carbon fiber composites. However, in the field of split assembled wheel structures, patents and literatures for systematically introducing a structural design method for a split carbon fiber composite rim is not published, and there are many technological gaps and technological bottlenecks.

SUMMARY

The present disclosure designs and develops a variable thickness rim structure made of carbon fiber composite. A three-sectional and symmetrically-stacked carbon fiber composite rim structure is formed by a radially outer ply block, an axially outboard ply block, and an axially inboard ply block. A differential layer variable thickness design is adopted, so that the rim has light weight, high strength, and convenience in forming and manufacturing.

The present disclosure further designs and develops a ply design method for a variable thickness rim structure made of carbon fiber composite. The obtained carbon fiber composite rim structure have the lowest weight and the best fatigue resistance and impact resistance by optimizing the thicknesses and angles of thickness variable areas.

The technical solution provided by the present disclosure is that:

a variable thickness rim structure made of carbon fiber composite includes:

a radially outer ply block that is paved as a radially outer side of the rim structure, and is of an equal thickness multilayer structure;

an axially outboard ply block that is paved as an axially outboard part of a radially inner side of the rim structure, and is of a variable thickness differential layer structure;

an axially inboard ply block that is paved as an axially inboard part of the radially inner side of the rim structure, and is of a variable thickness differential layer structure;

a filling ply block that is paved among the radially outer ply block, the axially outboard ply block, and the axially inboard ply block, and is an equal thickness multilayer structure, where a first end of the axially outboard ply block and a first end of the axially inboard ply block extend radially inwards to form an annular connecting flange;

a second end of the axially outboard ply block extends axially outwards and a second end of the axially inboard ply block extends axially inwards to form a rim ring together with the radially outer ply block.

In some embodiments, the radially outer ply block includes 15 layers in total, and has a total thickness of 2.25 mm. Various layers of the radially outer ply block are paved in a direction from the radially outer side to the radially inner side of the rim structure; first angles of the various layers of the radially outer ply block are as follows respectively:

[45°/−45°/0°/90°/45°/0°/90°/90°/90°/0°/−45°/90°/45°/ 90°/0° ].

In some embodiments, the axially outboard ply block includes 25 layers in total. Various layers of the axially outboard ply block are paved in the direction from the radially outer side to the radially inner side of the rim structure. The axially outboard ply block includes a first axially outboard ply area, a second axially outboard ply area, and a third axially outboard ply area that are arranged continuously in sequence.

Where, a sixth layer, a twelfth layer, and a twentieth layer of the first axially outboard ply area are first axially outboard differential layers; a starting end of each of the first axially outboard differential layers is the second end of the axially outboard ply block; lengths of the first axially outboard differential layers are increased layer by layer from outside to inside; an increment value of adjacent two of the first axially outboard differential layers is ranged from 1.5 to 3 mm; and a termination end of the twentieth layer of the first axially outboard ply area is close to a first end of the second axially outboard ply area.

A third layer, a ninth layer, a fourteenth layer, a seventeenth layer, and a twenty-third layer in the third axially outboard ply area are second axially outboard differential layers; a starting end of each of the second axially outboard differential layers is the first end of the axially outboard ply block; lengths of the second axially outboard differential layers are increased layer by layer from outside to inside; an increment value of adjacent two of the second axially outboard differential layers is ranged from 1.5 to 3 mm; and a termination end of the twenty-third layer of the third axially outboard ply area is close to a second end of the second axially outboard ply area.

When each of the first and second axially outboard differential layers is paved, a next layer is paved in an overlapping manner with a first overlapping angle less than tangent ($1/10$).

Remaining layers, except the first and second axially outboard differential layers, of the axially outboard ply block are shared layers, and are uniformly covered and paved in the first axially outboard ply area, the second axially outboard ply area, and the third axially outboard ply area; a first glass fiber layer is further paved on a radially outer side of a twenty-fifth layer of the axially outboard ply block.

In some embodiments, second angles of the various layers of the axially outboard ply block are as follows respectively from outside to inside: [45°/90°/−45°/0°/90°/45°/90$_2$°/−45°/ 0°/90°/45°/90$_2$°/−45°/0°/45°/90°/0°/−45$_2$°/45° ].

In some embodiments, the axially inboard ply block includes 36 layers in total. Various layers of the axially inboard ply block are paved in the direction from the outside to inside of the rim structure. The axially inboard ply block includes a first axially inboard ply area, a second axially inboard ply area, and a third axially inboard ply area that are arranged continuously in sequence.

Where, a second layer, a sixth layer, an eighth layer, a eleventh layer, a thirteenth layer, a sixteenth layer, a eighteenth layer, a twenty-first layer, a twenty-third layer, a twenty-sixth layer, a twenty-eighth layer, a thirty-first layer, a thirty-third layer, and a thirty-fifth layer of the first axially inboard ply area are first axially inboard differential layers; a starting end of each of the first axially inboard differential layers is the first end of the axially inboard ply block; lengths of the first axially inboard differential layers are increased layer by layer from outside to inside; an value of adjacent two of the first axially inboard differential layers is ranged from 1.5 to 3 mm; and a termination end of the thirty-fifth layer of the first axially inboard ply area is close to a first end of the second axially inboard ply area.

A fourth layer, a ninth layer, a fourteenth layer, a nineteenth layer, a twenty-fourth layer, and a twenty-ninth layer of the third axially inboard ply area are second axially inboard differential layers; a starting end of each of the second axially inboard differential layers is the second end of the axially inboard ply block; lengths of the second axially inboard differential layers are increased layer by layer from outside to inside; an increment value of adjacent two of the second axially inboard differential layers is ranged from 1.5 to 3 mm; a termination end of the twenty-ninth layer of the third axially inboard ply area is close to a second end of the second axially inboard ply area.

When each of the first and second axially inboard differential layers is paved, a next layer is paved in an overlapping manner with a second overlapping angle which is less than tangent ($1/10$).

Remaining layers, except the first and second axially inboard differential layers, of the axially inboard ply block are shared layers, and are uniformly covered and paved in the first axially inboard ply area, the second axially inboard ply area, and the third axially inboard ply area; a second glass fiber layer is further paved on a radially outer side of a thirty-sixth layer of the axially inboard ply block.

In some embodiments, third angles of the various layers of the axially inboard ply block are as follows respectively from outside to inside:

[45°/90°/0°/−45°/90°/45°/90°/−45°/0°/45°/90°/−45°/90/ 45°/90°/−45°/90°/45°/0°/−45°/90°/45°/90°/−45°/0°/ 45°/−45°/90°/45°].

In some embodiments, the filling ply block includes 15 layers with lengths that vary stepwise; various layers of the filling ply block are paved in the direction from the radially outer side to the radially inner side of the rim structure; fourth angles of the various layers of the filling ply block are as follows respectively: [45°/90°/−45°/0°/45°/90°/0°/ −45°]$_{2s}$.

In some embodiments, a first layer of the radially outer ply block and the twenty-fifth layer of the axially outboard ply are paved by a same first layer piece, and a second layer of the radially outer ply block and a twenty-fourth layer of the axially outboard ply block are paved by a same second layer piece; the first layer of the radially outer ply block and the thirty-sixth layer of the axially inboard ply block are paved by a same third layer piece, and the second layer of the radially outer ply block and the thirty-fifth layer of the axially inboard ply block are paved by a same fourth layer piece; the twenty-fifth layer of the axially outboard ply block and the thirty-sixth layer of the axially inboard ply block are paved by a same fifth layer piece, and the twenty-fourth layer of the axially outboard ply block and the thirty-fifth layer of the axially inboard ply block are paved by a same sixth layer piece.

A ply design method for a variable thickness rim structure made of carbon fiber composite includes:

determining overall thickness of the rim structure, under an assumption that the rim structure is an equal thickness structure;

performing free dimension optimization on an assembled wheel comprising the rim structure based on fatigue and impact conditions to obtain variable thickness areas and thicknesses of the variable thickness areas;

paving layers in a manner of layer intercalating and with variable thickness, and optimizing thicknesses and angles of layers of the variable thickness areas, so that the rim structure obtained has a lowest weight and a best fatigue resistance and impact resistance.

In some embodiments, a formula for determining the overall thickness $t_c$ is:

$$t_c = t_a \sqrt{\sigma_{sa}/\sigma_{sc}},$$

where, $t_a$ is the thickness of an aluminum alloy wheel rim cast according to the same size as that of the rim structure, $\sigma_{sa}$ is the tensile strength of aluminum alloy, and $\sigma_{sc}$, is the longitudinal tensile strength of a carbon fiber composite.

When paving is performed in the manner of layer intercalating and with variable thickness, a layer adding strategy of intercalating differential layers is adopted in an area needing to be thickened of the rim structure, and a layer reducing strategy of reducing shared layers is adopted in an area needing to be thinned of the rim structure, and angles of layers of the rim structure meet requirements that: a number of layers at +45° is equal to a number of layers at −45°; proportions of layers at +45°, −45°, 0°, and 90° among total number of layers are not less than 10%; a number of continuous layers at a same angle is no more than 4.

When the thicknesses and angles of layers in the variable thickness areas are optimized, so that the angles of layers of the rim structure meet the requirements that: the number of layers at +45° is equal to the number of layers at −45°; the proportions of layers at +45°, −45°, 0°, and 90° among total number of layers are not less than 10%⁻; the number of the continuous layers at the same angle is no more than 4.

The present embodiment has the following beneficial effects:

(1) The present embodiment provides a "three-sectional symmetrical stacking" ply design solution of the carbon fiber composite rim structure, which makes the rim structure more compact. In addition, a three-way symmetrical design makes the resistance to structural deformation higher when the rim structure bears the static and dynamic loads from three directions of space. Meanwhile, a sectional ply design makes production and manufacturing processes of the rim easier, so as to improve the production efficiency of the rim, reduce the production cost, and facilitate large-batch production. During optimization design of the thickness and angle of the rim structure, the "three-sectional symmetrical stacking" ply can effectively reduce the ply design variables of the rim, and prevent the variable dimensions from increasing greatly to make an optimization algorithm difficult to converge.

(2) In the variable thickness ply design method for the carbon fiber composite rim structure established by the present disclosure, thicker plies are paved at a part with large bearing capacity, and fewer plies are paved at a part with small bearing capacity, so as to take full advantage of the bearing capacity of the material of each part, and the carbon fiber composite rim structure is more excellent in performance, lighter in weight, less in used materials, and axially inboard in production cost.

(3) The ply design method for the variable thickness rim structure made of carbon fiber composite provided by the present disclosure illustrates a forward ply structure design method for a carbon fiber composite rim structure. The ply design is convenient and quick, and the ply paving efficiency is high. The designed variable thickness rim structure made of carbon fiber composite has high lightweight degree, and strong fatigue resistance and impact resistance.

(4) The carbon fiber composite rim of the present disclosure can be matched with the spoke made of different materials and in different structural forms, so as to take full advantage of the unique material performance of each of the rim and spoke of the wheel made from a mixed material and the advantages of a forming manufacturing process.

DETAILED DESCRIPTION OF THE EMBODIMENTS

Figure 1:
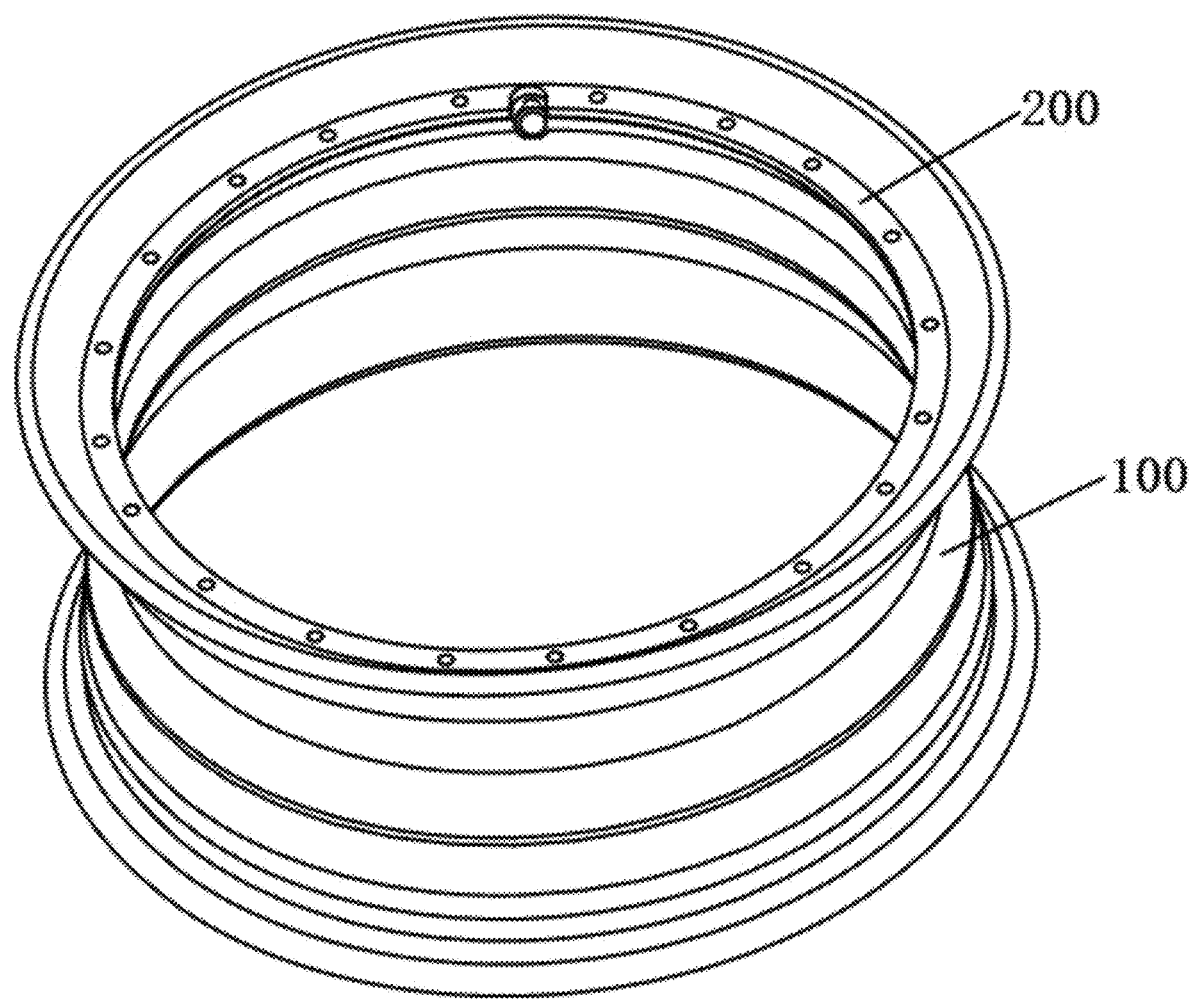
FIG. 1 is a schematic structural diagram of a variable thickness rim structure made of carbon fiber composite according to the present disclosure.
Figure 2:
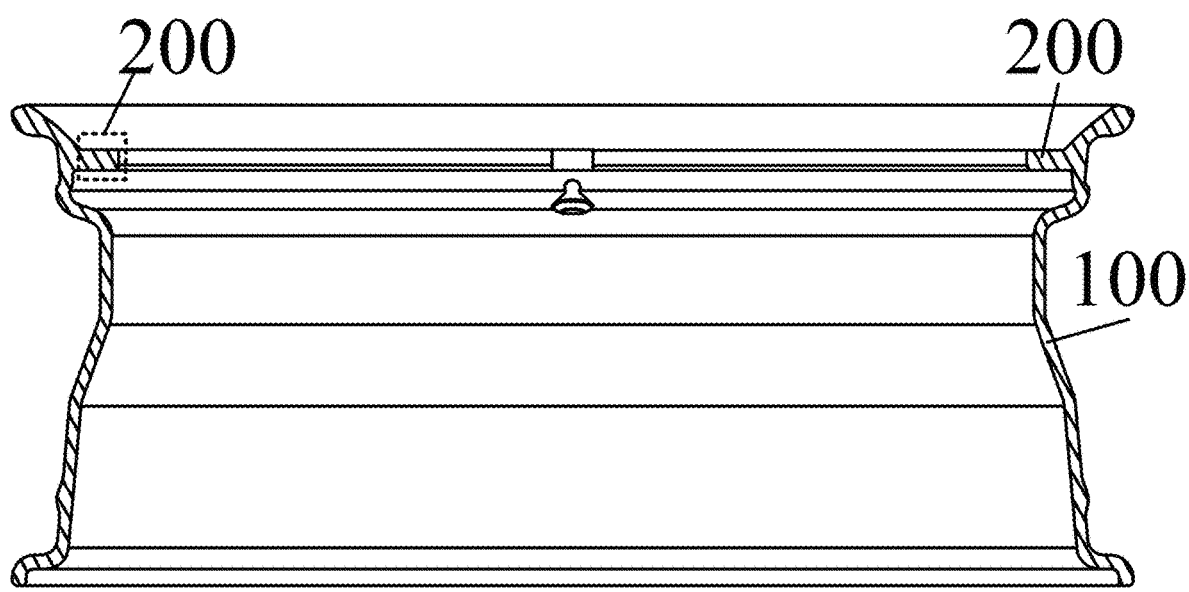
FIG. 2 is a sectional view of the variable thickness rim structure made of carbon fiber composite according to the present disclosure.

The present disclosure is further described in detail below with reference to the accompanying drawings, so that those skilled in the art can implement with reference to the text of the description.

As shown in FIGS. 1 to 10, the present disclosure provides a variable thickness rim structure made of carbon fiber composite, which includes a rim ring 100, a connecting flange 200, a radially outer ply block 300, an axially outboard ply block 400, an axially inboard ply block 500, and a filling ply block 600. A variable thickness carbon fiber composite rim is of an axisymmetric multilayer structure. The radially outer ply block 300 is arranged as a radially outer side of the rim structure. The axially outboard ply block 400 is paved as an axially outboard part of a radially inner side of the rim structure. The axially inboard ply block 500 is paved as an axially inboard part of the radially inner side of the rim structure. The filling ply block 600 is further paved in a gap formed among the radially outer ply block 300, the axially outboard ply block 400, and the axially inboard ply block 500. The radially outer ply block, the axially outboard ply block, and the axially inboard ply block is in a "three-sectional symmetrical stacking" ply form. A first end of the axially outboard ply block 400 and a first end of the axially inboard ply block extend in a symmetrical direction to form the connecting flange 200. The connecting flange 200 is configured for connecting the rim and a matched spoke to form an assembled wheel. The connecting flange 200 is arranged horizontally. A second end of the axially outboard ply block 400 extends axially outwards and a second end of the axially inboard ply block 500 extends axially inwards to form the rim ring 100 together with the radially outer ply block 300.

The length of each ply block is determined by calculating the designed rim size. A contour shape of the radially outer ply block 300 in the axial direction is ensured by the radially inner surface shape of a rim forming mold according to the structural design of the rim and the assembly fit requirement with a tire. Contour shapes of the axially outboard ply block 400 and the axially inboard ply block 500 are determined by the shape of the radially outer ply block 300 and a structure of the connecting flange 200 of the rim and the spoke. A shape of the filling ply block 600 is formed by the shapes of the axially outboard ply block 400 and the axially inboard ply block 500 and the structure of the connecting flange 200 of the rim and the spoke. The sequence of layers and the fiber direction are selected according to the requirement of fatigue and impact performance of the rim.

The radially outer ply block 300 is of an equal thickness multilayer structure. Both the axially outboard ply block 400 and the axially inboard ply block 500 are of variable thickness differential layer structures. Each of the axially outboard ply block 400 and the axially inboard ply block 500 includes multiple differential layers and shared layers. In addition, in the paving direction, a next layer relative to each current differential layer is a shared layer and is paved on the differential layer in an overlapping manner. The overlapping angle is less than tan (1/10), where the differential layer is the layer that is paved in a local area of a ply surface; the shared layer is the layer that is paved in all area of the ply surface.

In the present embodiment, preferably, the value of the thickness of a single layer of the carbon fiber composite is measured by calculating the thickness of unidirectional cloth woven by carbon fibers of 24K tows T300, and is 0.15 mm.

For the carbon fibers of other tows and model numbers, the number of layers, the sequence of layers, and the direction of each layer need to be adjusted and changed correspondingly due to the change of the mechanical properties of the material and the thickness of the single layer. However, the "three-sectional symmetrical stacking" ply design method is generally applicable.

As shown in FIGS. 5 to 10, in the present embodiment, preferably, all of the paving directions of the radially outer ply block 300, the axially outboard ply block 400, the axially inboard ply block 500, and the filling ply block 600 are from the radially outer side of the rim to the symmetrical axis direction of the radially inner side of the rim.

In the present embodiment, preferably, the 0° direction of layer is defined as the direction that carbon fibers are parallel to the symmetrical axis of the rim or point to a circumferential center; the 90° direction of layer is defined as the direction that the carbon fibers are perpendicular to the symmetrical axis of the rim. The angles and the sequence of layers of each ply block are as shown in Table 1.

TABLE 1 angles and sequence of layers in each ply block of rim

| | | Upper ply block | | | Lower ply block | | | |
| --- | --- | --- | --- | --- | --- | --- | --- | --- |
| | Outer ply block | First upper ply area | Second upper ply area | Third upper ply area | First lower ply area | Second lower ply area | Third lower ply area | Filling ply block |
| Layer 1 | 45 | | 45 | | | 45 | | 45 |
| Layer 2 | -45 | | 90 | | 90 | | | 90 |
| Layer 3 | 0 | | | -45 | 0 | | | -45 |
| Layer 4 | 90 | | 0 | | | 90 | | 0 |
| Layer 5 | 45 | | 90 | | | -45 | | 45 |
| Layer 6 | 0 | -45 | | | 90 | | | 90 |
| Layer 7 | 90 | | 45 | | | 45 | | 0 |
| Layer 8 | 90 | | 90 | | 90 | | | -45 |
| Layer 9 | 90 | | | 90 | | | 0 | 0 |
| Layer 10 | 0 | | -45 | | | -45 | | 90 |
| Layer 11 | -45 | | 0 | | 0 | | | 45 |
| Layer 12 | 90 | 0 | | | | 45 | | 0 |
| Layer 13 | 45 | | 90 | | 90 | | | -45 |
| Layer 14 | 90 | | | 45 | | | 90 | 90 |
| Layer 15 | 0 | | 90 | | | -45 | | 45 |
| Layer 16 | | | 90 | | 0 | | | |
| Layer 17 | | | | -45 | 90 | | | |
| Layer 18 | | | 0 | | | 45 | | |
| Layer 19 | | | 45 | | | | 0 | |
| Layer 20 | | -45 | | | 90 | | | |
| Layer 21 | | | 90 | -45 | | | | |
| Layer 22 | | | 0 | | | 90 | | |
| Layer 23 | | | | -45 | 45 | | | |
| Layer 24 | | | -45 | | | | -45 | |
| Layer 25 | | | 45 | | | 0 | | |
| Layer 26 | | | | | -45 | | | |
| Layer 27 | | | | | | 90 | | |
| Layer 28 | | | | | 45 | | | |
| Layer 29 | | | | | | | 45 | |
| Layer 30 | | | | | | 90 | | |
| Layer 31 | | | | | -45 | | | |
| Layer 32 | | | | | | | 0 | |
| Layer 33 | | | | | 45 | | | |
| Layer 34 | | | | | | -45 | | |
| Layer 35 | | | | | 90 | | | |

TABLE 1-continued angles and sequence of layers in each ply block of rim

| | Upper ply block | | | Lower ply block | | | |
|---|---|---|---|---|---|---|---|
| Outer ply block | First upper ply area | Second upper ply area | Third upper ply area | First lower ply area | Second lower ply area | Third lower ply area | Filling ply block |
| Layer 36 | | | | | 45 | | |

Figure 3:
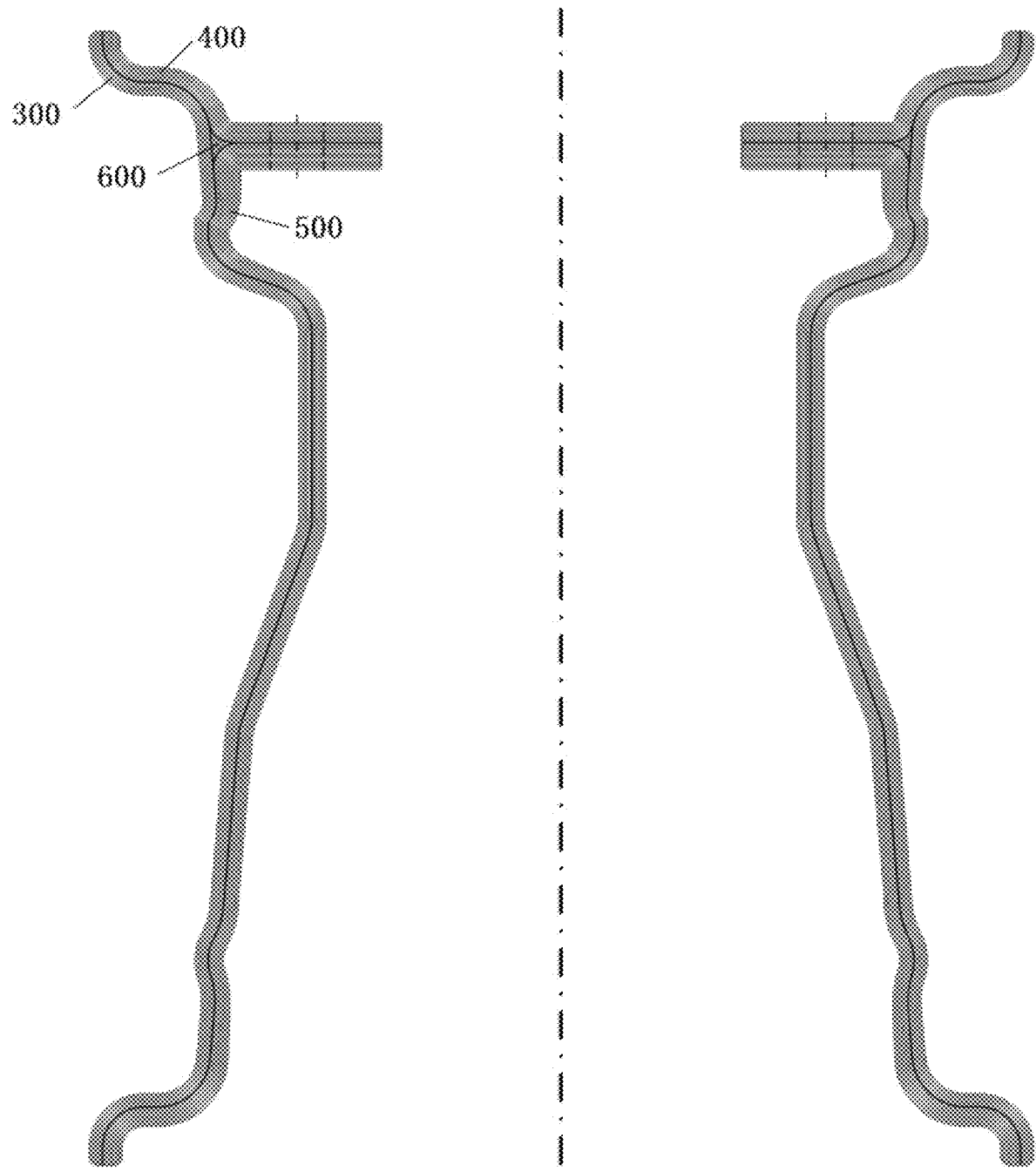
FIG. 3 is a schematic diagram of layers of ply blocks of the variable thickness rim structure made of carbon fiber composite according to the present disclosure.
Figure 4:
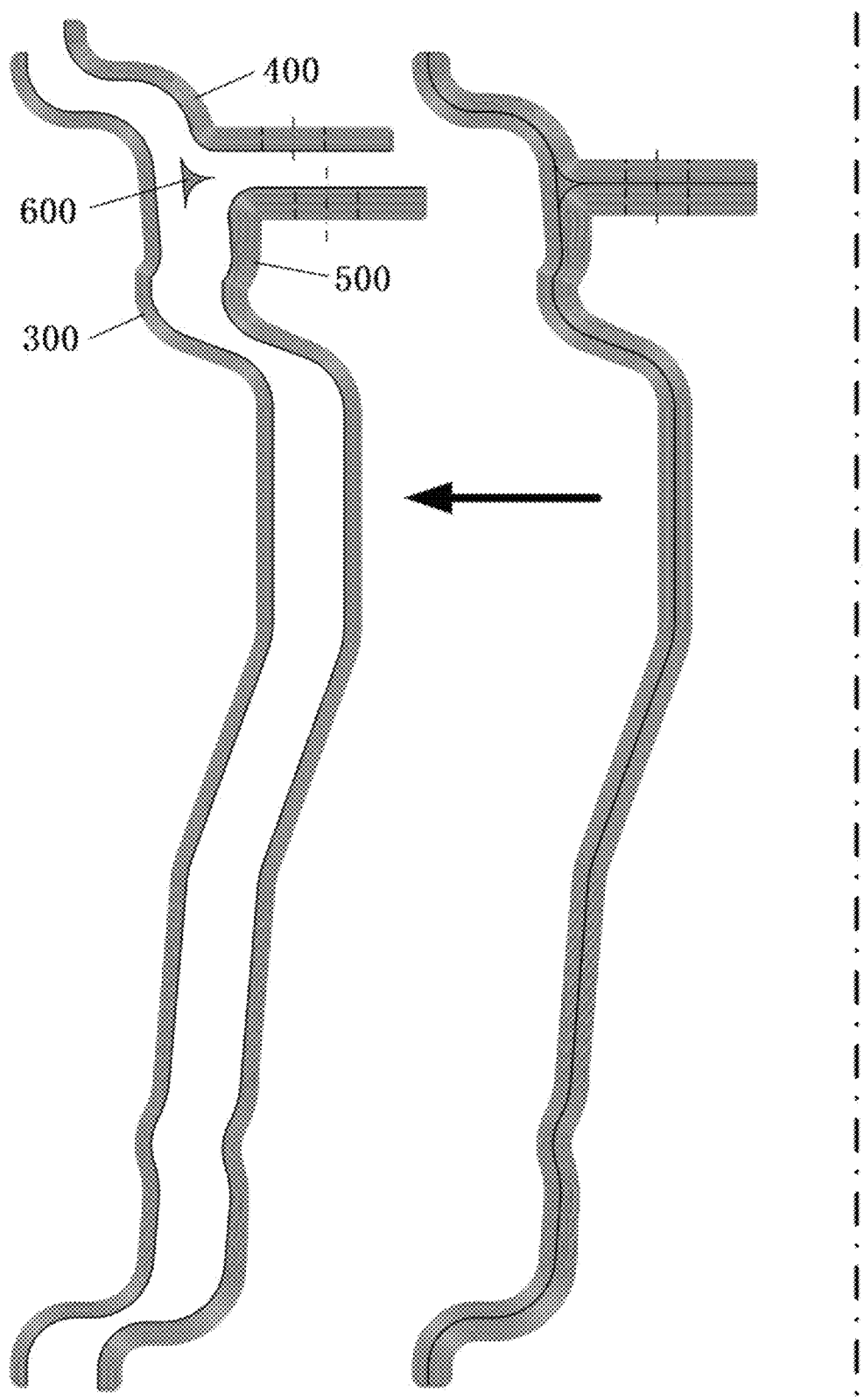
FIG. 4 is an assembly view and an exploded view of the variable thickness rim structure made of carbon fiber composite according to the present disclosure.
Figure 5:
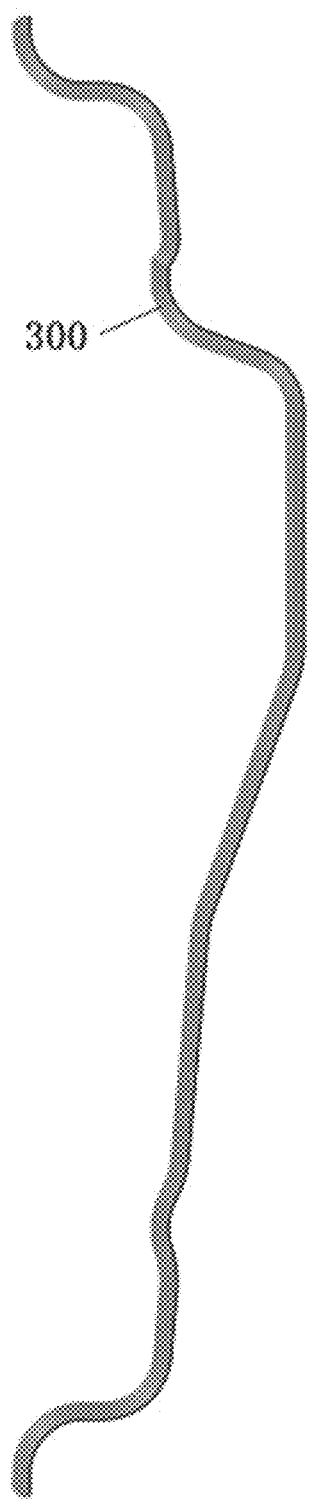
FIG. 5 is a schematic diagram of layers of a radially outer ply block according to the present disclosure.

As shown in FIG. 3, FIG. 4, FIG. 5, and Table 1, the radially outer ply block 300 adopts an equal thickness ply design and has a total thickness of 2.25 mm. A total of 15 carbon fiber composite layers are paved. The first angles and sequence of various layers are respectively as follows:

[45°/−45°/0°/90°/45°/0°/90°/90°/90°/0°/−45°/90°/45°/90°/0°].

Figure 6:
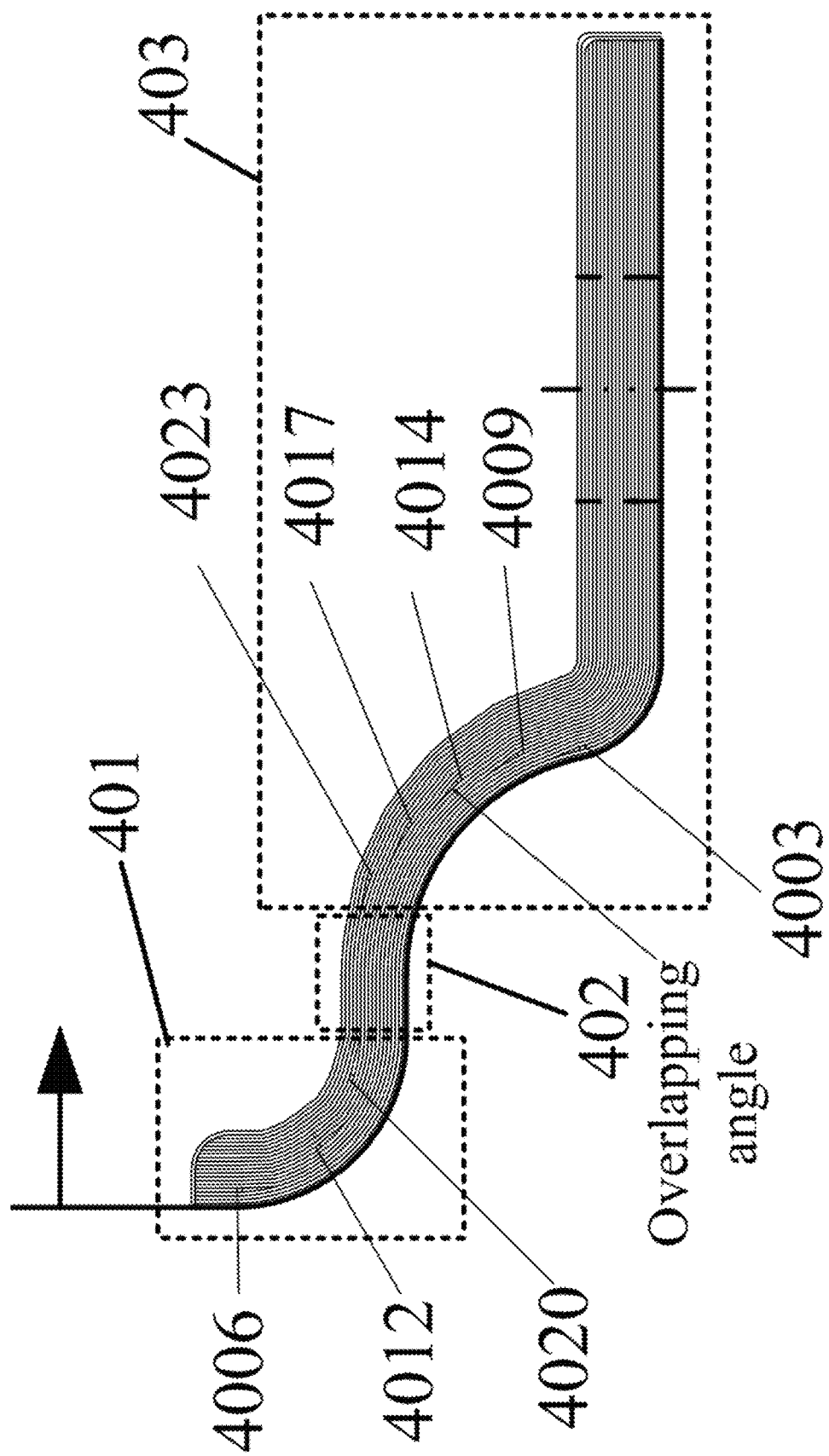
FIG. 6 is a schematic diagram of ply areas and layers of an axially outboard ply block of the rim structure according to the present disclosure.
Figure 7:
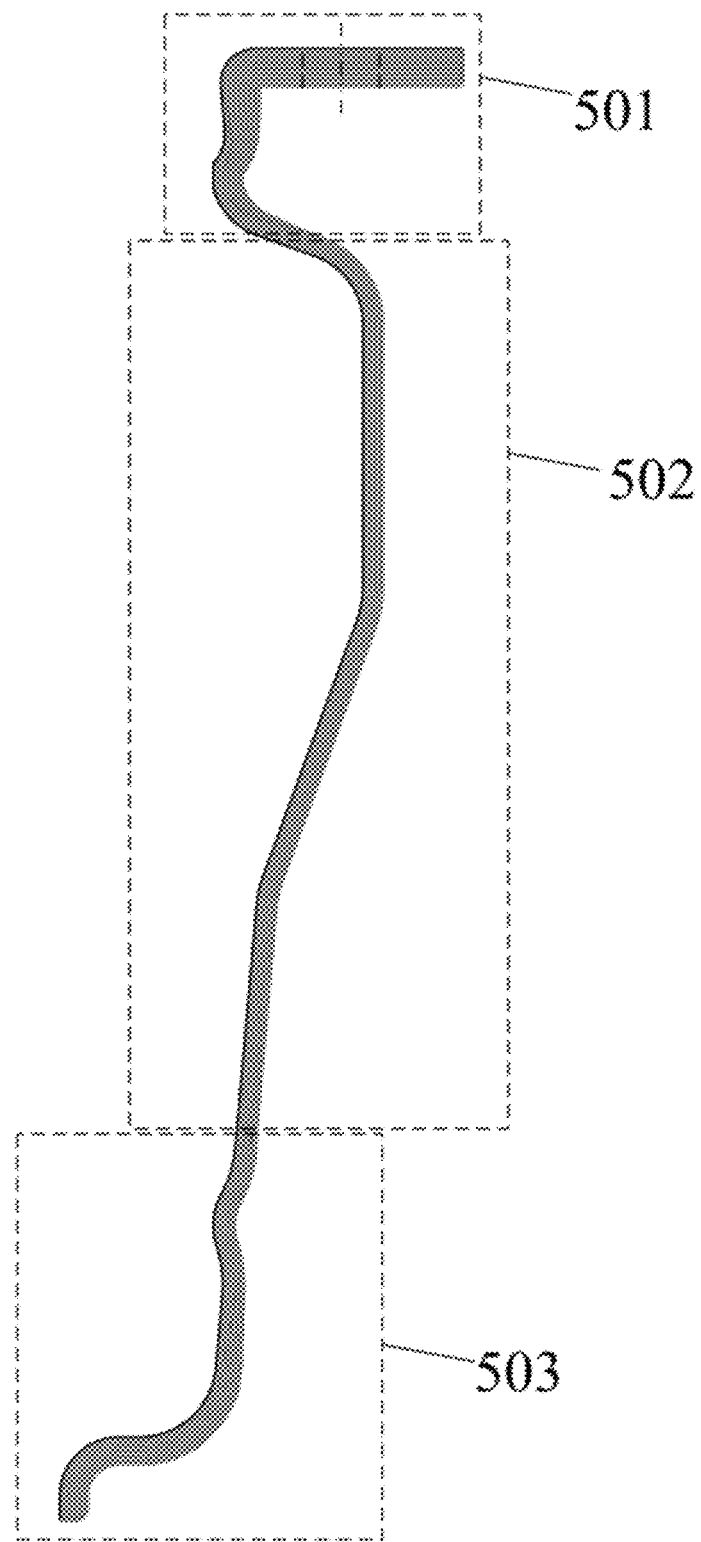
FIG. 7 is a schematic diagram of ply areas and layers of an axially inboard ply block according to the present disclosure.

As shown in FIG. 3, FIG. 4, FIG. 6, and Table 1, the axially outboard ply block 400 is designed by adopting a variable thickness ply according to the performance of the rim. A total of 25 carbon fiber composite layers are paved. The axially outboard ply block includes three sub-ply areas, namely, a first axially outboard ply area 401, a second axially outboard ply area 402, and a third axially outboard ply area 403, which are arranged continuously in sequence.

In the first axially outboard ply area 401, a sixth layer 4006, a twelfth layer 4012, and a twentieth layer 4020 are differential layers; a starting end of each differential layer is the second end of the axially outboard ply block 400; the lengths of various differential layers are increased layer by layer from outside to inside; the range of the increment value of adjacent two differential layers is 1.5 to 3 mm; in addition, a termination end of the twentieth layer 4020 is close to a first end of the second axially outboard ply area 402. In the third axially outboard ply area 403, a third layer 4003, a ninth layer 4009, a fourteenth layer 4014, a seventeenth layer 4017, and a twenty-third layer 4023 are all differential layers; a starting end of each differential layer is the first end of the axially outboard ply block 400; the lengths of various differential layer are increased layer by layer from outside to inside; the range of the increment value of adjacent two differential layers is 1.5 to 3 mm, where a termination end of the third layer 4003 extends beyond a horizontal section of the connecting flange 200 of the rim and the spoke; and a termination end of the twenty-third layer 4023 is close to a second end of the second axially outboard ply area 402. Remaining layers, except the differential layers, of the axially outboard ply block 400 are shared layers, which are uniformly covered and paved in the first axially outboard ply area 401, the second axially outboard ply area 402, and the third axially outboard ply area 403 of the axially outboard ply block 400.

In the axially outboard ply block 400, a first glass fiber layer is additionally paved on a radially outer side of a twenty-fifth layer of the axially outboard ply block. The problem about electrochemical corrosion caused by the electric conduction of the carbon fibers is avoided when the carbon fiber composite rim is connected to a spoke of a different material. A starting end of the first glass fiber layer is located at the first end of the axially outboard ply block, and a termination end of the first glass fiber layer is at a tail end of the horizontal section of the connecting flange 200 of the rim and the spoke.

In the present embodiment, preferably, the thickness of the first glass fiber layer is 0.1 mm.

As shown in FIG. 3, FIG. 4, FIG. 7, FIG. 8, FIG. 9, and Table 1, the axially inboard ply block 500 is designed by adopting a variable thickness ply according to the performance of the rim. A total of 36 carbon fiber composite layers are paved. The axially inboard ply block includes three sub-ply areas, namely, a first axially inboard ply area 501, a second axially inboard ply area 502, and a third axially inboard ply area 503, which are arranged continuously in sequence.

In the first axially inboard ply area 501, a second layer 5002, a sixth layer 5006, and a eighth layer 5008, a eleventh layer 5011, a thirteenth layer 5013, a sixteenth layer 5016, a eighteenth layer 5018, a twenty-first layer 5021, a twenty-third layer 5023, a twenty-sixth layer 5026, a twenty-eighth layer 5028, a thirty-first layer 5031, a thirty-third layer 5033, and a thirty-fifth layer 5035 are differential layers; a starting end of each differential layer is a first end of the axially inboard ply block 500; the lengths of various differential layers are increased layer by layer from outside to inside; the range of the increment value of adjacent two differential layers is 1.5 to 3 mm, where a termination end of the second layer 5002 extends beyond the horizontal section of the connecting flange 200; the thirty-fifth layer 5035 is close to a first end of the second axially inboard ply area 502. In the third axially outboard ply area 503, a fourth layer 5004, a ninth layer 5009, a fourteenth layer 5014, a nineteenth layer 5019, a twenty-fourth layer 5024, and a twenty-ninth layer 5029 are differential layers; a starting end of each differential layer is located at the lowest end of the rim ring 100, and is the second end of the axially inboard ply block 500; the lengths of various differential layer is increased layer by layer from outside to inside, where a termination end of the twenty-ninth layer 5029 is close to a second end of the second ply area 502; the range of the increment value of adjacent two differential layers is 1.5 to 3 mm. Remaining layers, except the first and differential layers, of the axially inboard ply block 500 are shared layers, which are uniformly covered and paved in the first axially inboard ply area 501, the second axially inboard ply area 502, and the third axially inboard ply area 503.

The third angles and sequence of various layers of the axially inboard ply block 500 are respectively as follows:

[45°/90°/0°/−45°/90°/45°/90°/−45°/0°/45°/90°/−45°/0/90°/45°/90°/−45°/90°/45°/0°/−45°/90°/45°/90°/−45°/0°/45°/−45°/90°/45° ].

A second glass fiber layer is additionally paved outside the carbon fiber composite layer of the thirty-sixth layer 5036 of the axially inboard ply block 500. The problem about electrochemical corrosion caused by the electric conduction of the carbon fibers is avoided when the rim made from the carbon fiber composite is connected to a spoke made from a different material. A starting end of the second glass fiber layer is located at the first end of the axially outboard ply block, and a termination end of the second glass fiber layer is at the tail end of a horizontal section of the connecting flange 200 of the rim and the spoke. The first glass fiber layer of the axially outboard ply block 400 and the second glass fiber layer of the axially inboard ply block 500 uniformly coat the connecting flange 200 of the spoke in a rim area.

In the present embodiment, preferably, the thickness of the second glass fiber layer is 0.1 mm.

As shown in FIG. 4 and Table 1, the first carbon fiber composite layer of the radially outer ply block 300 and the twenty-fifth carbon fiber composite layer of the axially outboard ply block 400 are from the same layer piece, and the second carbon fiber composite layer of the radially outer ply block 300 and the twenty-fourth carbon fiber composite layer of the axially outboard ply block 400 are from the same layer. Meanwhile, the first carbon fiber composite layer of the radially outer ply block 300 and the thirty-sixth carbon fiber composite layer of the axially inboard ply block 500 are from the same layer piece, and the second carbon fiber composite layer of the radially outer ply block 300 and the thirty-fifth layer carbon fiber composite layer 5035 of the axially inboard ply block 500 are from the same layer piece. The twenty-fifth carbon fiber composite layer of the axially outboard ply block 400 and the thirty-sixth carbon fiber composite layer of the axially inboard ply block 500 are from the same layer piece and the twenty-fourth carbon fiber composite layer of the axially outboard ply block 400 and the thirty-fifth carbon fiber composite layer 5035 of the axially inboard ply block 500 are from the same layer piece.

The angles of the 15 layers of the radially outer ply block 300 and the 17 shared layers of the axially outboard ply block 400 adopt a strategy of symmetry and equality. The angles of the 15 layers of the radially outer ply block 300 and the 16 shared layers of the axially inboard ply block 500 adopt a strategy of symmetry and equality. The angles of the 17 shared layers of the axially outboard ply block 400 and the 16 shared layers of the axially inboard ply block 500 adopt a symmetrical and equal strategy.

Figure 8:
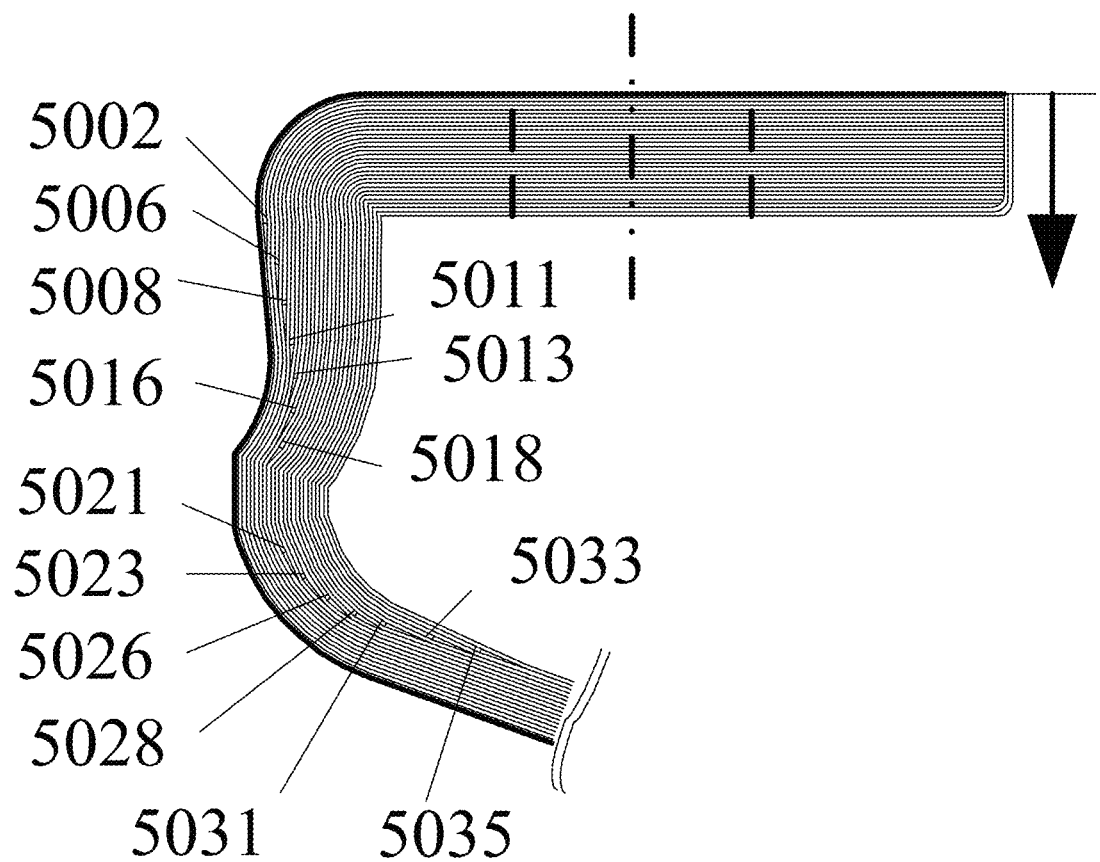
FIG. 8 is a schematic diagram of layers of a first axially inboard ply area according to the present disclosure.
Figure 9:
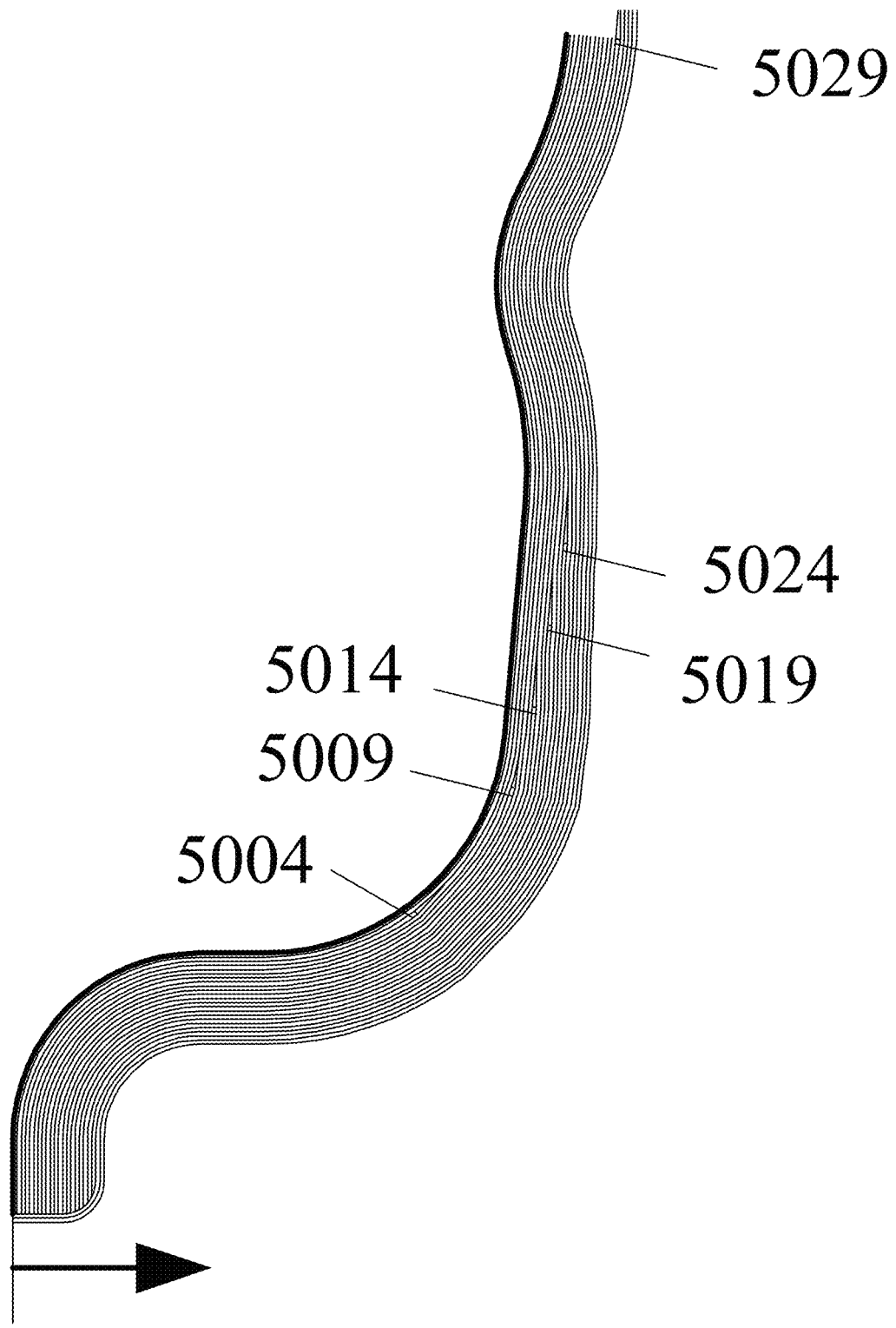
FIG. 9 is a schematic diagram of layers of a third axially inboard ply area according to the present disclosure.
Figure 10:
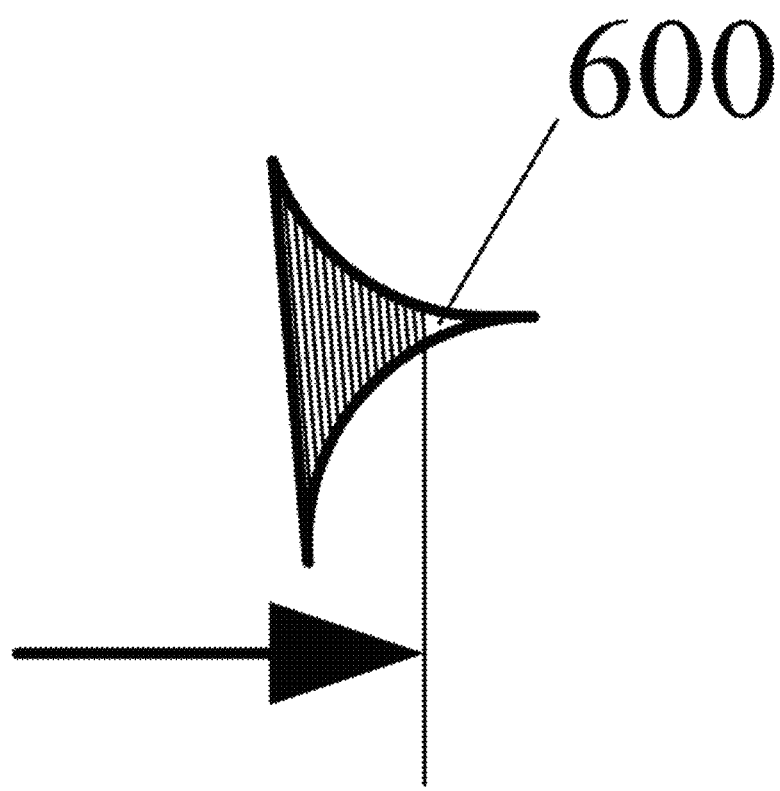
FIG. 10 is a schematic diagram of layers of a filling ply block according to the present disclosure.

As shown in FIG. 6, FIG. 8, and FIG. 9, the next layer relative to each current differential layer is paved in an overlapping manner with an overlapping angle is less than tangent (1/10), when the sixth differential layer 4006, the twelfth differential layer 4012, and the twentieth differential layer 4020 of the first axially outboard ply area 401 in the axially outboard ply block, the third differential layer 4003, the ninth differential layer 4009, the fourteenth differential layer 4014, the seventeenth differential layer 4017, and the twenty-third differential layer 4023 of the third axially outboard ply area 403 in the axially outboard ply block, the second differential layer 5002, the sixth differential layer 5006, and the eighth differential layer 5008, the eleventh differential layer 5011, the thirteenth differential layer 5013, the sixteenth differential layer 5016, the eighteenth differential layer 5018, the twenty-first differential layer 5021, the twenty-third differential layer 5023, the twenty-sixth differential layer 5026, the twenty-eighth differential layer 5028, the thirty-first differential layer 5031, the thirty-third differential layer 5033, and the thirty-fifth differential layer 5035 of the first axially inboard ply area 501 in the axially inboard ply block 500, and the fourth differential layer 5004, the ninth differential layer 5009, the fourteenth differential layer 5014, the nineteenth differential layer 5019, the twenty-fourth differential layer 5024, and the twenty-ninth differential layer 5029 of the third axially outboard ply area 503 in the axially inboard ply block 500 are paved.

Figure 11:
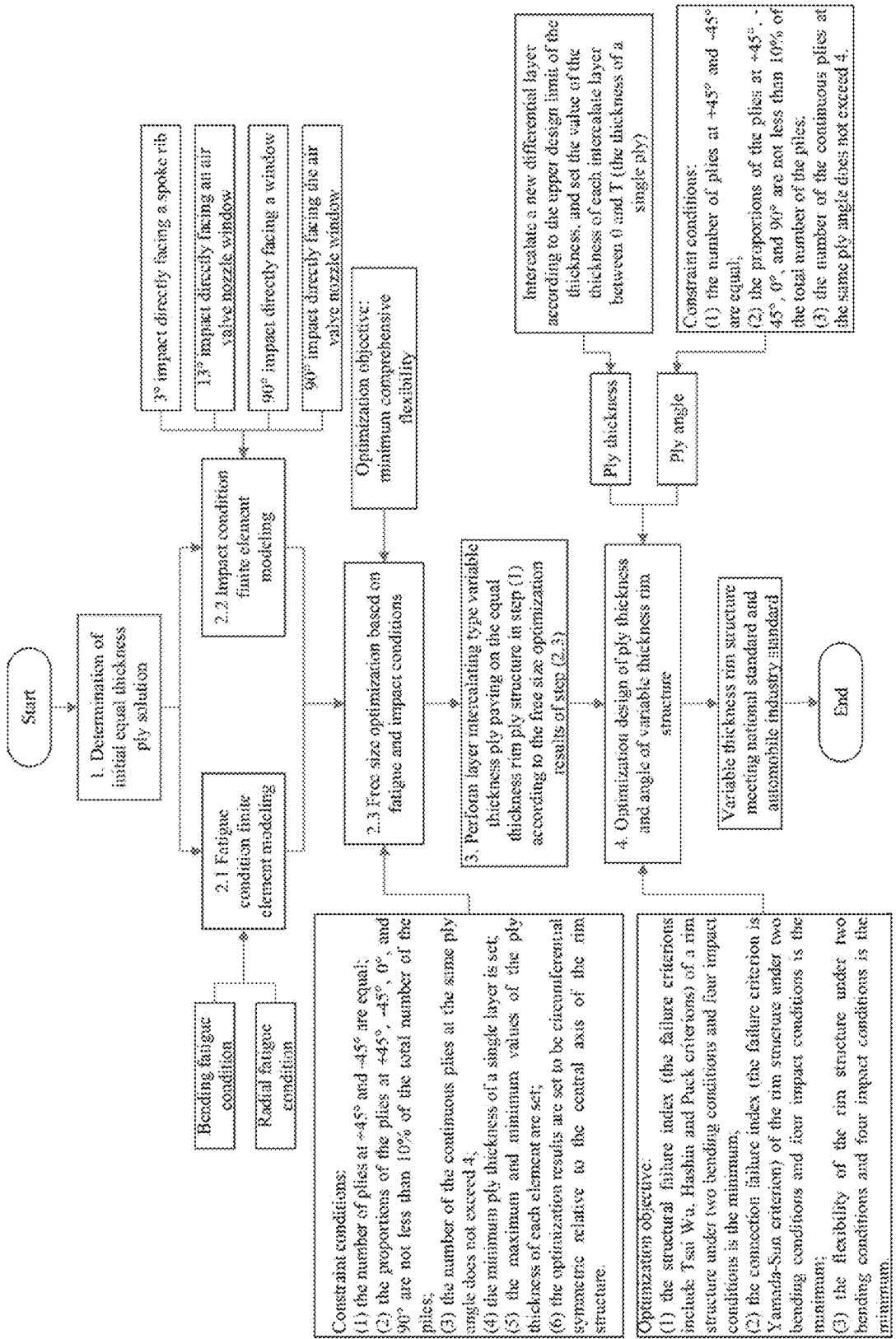
FIG. 11 is a flowchart of a ply design method for the variable thickness rim structure made of carbon fiber composite according to the present disclosure.

As shown in FIG. 11, the present embodiment further provides a ply design method for a variable thickness rim structure made of carbon fiber composite, which includes:
determining an overall thickness of a carbon fiber composite rim structure, under an assumption that the carbon fiber composite rim structure is an equal thickness structure;
performing an free dimension optimization on an assembled wheel including the carbon fiber composite rim structure based on fatigue and impact conditions to obtain variable thickness areas and the thicknesses of layers in each areas; and paving layers in a manner of layer intercalating and with variable thickness, and optimizing the thicknesses and the angles of layers in the variable thickness areas, so that the obtained carbon fiber composite rim structure has the lowest weight and the best fatigue resistance and impact resistance.

(1) Determination of Ply Solution Under an Initial Thickness:

The carbon fiber composite rim structure is assumed as an equal thickness structure, and the overall thickness of the carbon fiber composite rim is initially determined according to the thickness size of the aluminum alloy wheel rim cast in the same size.

A formula for determining the overall thickness $t_c$ is:

$$t_c = t_a \sqrt{\sigma_{sa}/\sigma_{sc}}$$

Where, $t_a$ is the thickness of an aluminum alloy wheel rim cast according to the same size as that of the variable thickness carbon fiber composite rim structure, $\sigma_{sa}$ is the tensile strength of aluminum alloy, and $\sigma_{sc}$ is the longitudinal tensile strength of a carbon fiber composite.

The total thickness is then assigned to the thickness of each ply block as required; the number of layers in each ply block is calculated by dividing the thickness of the ply block by the thickness of a single layer of the used carbon fiber composite, and rounding.

(2) Determination of a Variable Thickness Area:

In the present embodiment, preferably, the requirements stipulated in China standard GB/T5334-2005 Performance Requirements and Test Methods for Passenger Car Wheels, GB/T15704-2012 Impact Test method for Light Alloy Wheels of Roadway Vehicles, and Automobile Industry Standard QC/T991-2015 90° Impact Test Methods for Light Alloy Wheels of Passenger Cars are met.

Simulation models of an assembled wheel including the carbon fiber composite rim structure of the present embodiment under bending and radial fatigue conditions and 13° and 90° impact conditions are established by a finite element method.

A free dimension optimization model of the assembled wheel is then established, and a design variable in an optimization is the thickness of each element in a finite element model of a rim.

A target function in the optimization is the least comprehensive flexibility of the assembled wheel structure under fatigue and impact conditions. The constraint condition in the optimization is that the weight reduction rate of the carbon fiber composite rim structure is not less than a predetermined weight reduction target compared with a cast aluminum alloy wheel rim of the same size; and the minimum layer thickness of the single layer of the rim is set.

The number of layers at +45° is equal to the number of layers at −45°; the proportions of the layers at +45°, −45°, 0°, and 90° of the total number of layers are all not less than 10%; and the number of the continuous layers at the same angle is no more than 4.

The maximum value and the minimum value of the layer thickness of each element in the finite element model of the rim are set.

Optimization results are set to be axisymmetric relative to the central axis of the rim structure; then, free dimension optimization is performed on the assembled wheel to obtain variable thickness areas of the rim and the thickness of layers of each area.

(3) Paving Layers in a Layer Intercalating Manner and with Variable Thickness:

In order to ensure the continuity of the layers, based on the initial layer thickness determined in step (1), with reference to variable thickness result of a rim determined in step (2), a layer adding strategy of intercalating differential layers is adopted in an area of the rim needing to be thickened, and a layer reducing strategy of reducing a shared layer is adopted in an area of the rim needing to be thinned to obtain a variable thickness ply model of the rim.

The differential layers are intercalated and the shared layers are reduced, so as to ensure that the layers of the whole rim structure meet the requirements that: the number of layers at +45° is equal to the number of layer at −45°; the proportions of the layers at +45°, −45°, 0°, and 90° among the total number of the layers are all not less than 10%; and the rules that the differential layers of adjacent variable thickness areas are not in the same layer as far as possible, and the differential layers are close to a middle plane as far as possible.

(4) Optimization Design of Thicknesses and Angles of Layers of the Variable Thickness Rim Structure The thicknesses and the angles of layers of the variable thickness areas are optimized based on the initial variable thickness ply structure of the rim determined in step (3).

First, the thickness of each area is taken as a design variable, and an axially outboard limit value and an axially inboard limit value of each thickness variable are set.

During optimization, a new differential layer is intercalated into the areas of various thickness, so that the areas of various thickness reach an axially outboard limit value of a thickness design variable; then, the thickness value of each newly intercalated differential layer is set between 0 and T, where T is the thickness of a single layer.

If the thickness of the newly intercalated differential layer is 0, then the intercalation layer does not exist; otherwise, the intercalation layer exists, and in turn the thickness design variable is converted into a value variable of the intercalation layer.

The angle of each layer is also taken as an optimization design variable while optimizing the thickness variable, and the angle and the thickness variable are coupled; during optimizing, the angles of various layers of the whole rim structure meet the requirements that: the number of layers at +45° is equal to the number of layers at −45°; the proportions of layers at +45°, −45°, 0°, and 90° among the total number of the layers are all not less than 10%; the number of the continuous layers at a same angle is no more than 4.

The objective of this round of optimization is to make the weight of the rim structure lowest, and the fatigue resistance and the impact resistance optimal.

In the present embodiment, preferably, an optimization algorithm is a multi-objective genetic algorithm.

In another embodiment, preferably, an optimization algorithm is algorithms, such as a multi-objective particle swarm algorithm.

During an optimization design of the layer thickness and angle of the variable thickness rim structure, the optimization objective of the best fatigue resistance and impact resistance of the rim structure is quantified into three indicators: 1) the structural failure index of the rim structure under bending and radial fatigue conditions and 13° and 90° impact conditions is the minimum, and the failure criterions include Tsai-Wu Failure Criteria, Hashin's Failure Criteria, and Puck criterions, so as to ensure that the fatigue resistance and impact resistance of a main body structure of the rim are strongest. 2) The connection failure index of the rim structure under bending and radial fatigue conditions and 13° and 90° impact conditions is the minimum, and the failure criterion is Yamada-Sun criterion, so as to ensure that the fatigue resistance and impact resistance of a mechanical connection structure at the connecting flange of the rim and the spoke are strongest. 3) The flexibility of the rim structure under bending and radial fatigue conditions and 13° and 90° impact conditions is the minimum, so as to ensure that the overall stiffness of the rim structure is the maximum.

In the present embodiment, preferably, the 13° and 90° impact conditions include four conditions of impact directly facing a spoke rib at 13°, impact directly facing an air valve nozzle window at 13°, impact directly facing a window at 90°, and impact directly facing the air valve nozzle window at 90°.

Although the implementation solutions of the present disclosure have been disclosed as above, it is not limited to the application listed in the description and implementation manners. It can be fully applied to various fields suitable for the present disclosure. For those familiar with the art, additional modifications can be easily realized. Therefore, the present disclosure is not limited to specific details and illustrations shown and described herein without departing from the general concept defined by the claims and the equivalent scope.

The disclosed claimed is:

1. A variable thickness rim structure made of carbon fiber composite, formed by paving multiple layers of carbon fibers, comprising:
a radially outer ply block that is paved as a radially outer side of the rim structure, the radially outer ply block being of an equal thickness multilayer structure;
an axially outboard ply block that is paved as an axially outboard part of a radially inner side of the rim structure, the axially outboard ply block being of a variable thickness differential layer structure;
an axially inboard ply block that is paved as an axially inboard part of the radially inner side of the rim structure, the axially inboard ply block being of a variable thickness differential layer structure; and
a filling ply block that is paved among the radially outer ply block, the axially outboard ply block, and the axially inboard ply block;
wherein:
a first end of the axially outboard ply block and a first end of the axially inboard ply block extend radially inwards to form an annular connecting flange; and
a second end of the axially outboard ply block extends axially outwards, and a second end of the axially inboard ply block extends axially inwards to form a rim ring together with the radially outer ply block.

2. The variable thickness rim structure according to claim 1, wherein:
the radially outer ply block comprises 15 layers in total and has a total thickness of 2.25 mm;
various layers of the radially outer ply block are paved in a direction from the radially outer side to the radially inner side of the rim structure; and
first angles of the various layers of the radially outer ply block with respect to an axis direction of the variable thickness rim structure are as follows respectively: [45°/45°/0°/90°/45°/0°/90°/90°/90°/0°/−45°/90°/45°/90°/0°].

3. The variable thickness rim structure according to claim 2, wherein:
the axially outboard ply block comprises 25 layers in total;

various layers of the axially outboard ply block are paved in the direction from the radially outer side to the radially inner side of the rim structure;

the axially outboard ply block comprises a first axially outboard ply area, a second axially outboard ply area, and a third axially outboard ply area that are arranged continuously in sequence;

a sixth layer, a twelfth layer, and a twentieth layer of the first axially outboard ply area are first axially outboard differential layers; a starting end of each of the first axially outboard differential layers is the second end of the axially outboard ply block; lengths of the first axially outboard differential layers are increased layer by layer from radially outer side to radially inner side; an increment value of adjacent two of the first axially outboard differential layers is ranged from 1.5 to 3 mm; and a termination end of the twentieth layer of the first axially outboard ply area is close to a first end of the second axially outboard ply area;

a third layer, a ninth layer, a fourteenth layer, a seventeenth layer, and a twenty-third layer in the third axially outboard ply area are second axially outboard differential layers; a starting end of each of the second axially outboard differential layers is the first end of the axially outboard ply block; lengths of the second axially outboard differential layers are increased layer by layer from radially outer side to radially inner side; an increment value of adjacent two of the second axially outboard differential layers is ranged from 1.5 to 3 mm; and a termination end of the twenty-third layer of the third axially outboard ply area is close to a second end of the second axially outboard ply area;

when each of the first and second axially outboard differential layers is paved, a next layer is paved in an overlapping manner with a first overlapping angle less than tangent (1/10), the first overlapping angle being an included angle between corresponding one of the first and second axially outboard differential layers and the next layer;

remaining layers, except the first and second axially outboard differential layers of the axially outboard ply block, are shared layers and are uniformly covered and paved in the first axially outboard ply area, the second axially outboard ply area, and the third axially outboard ply area; and a first glass fiber layer is further paved on a radially outer side of a twenty-fifth layer of the axially outboard ply block.

4. The variable thickness rim structure according to claim 3, wherein second angles of the various layers of the axially outboard ply block with respect to the axis direction of the variable thickness rim structure are as follows respectively from radially outer side to radially inner side: [45°/90°/−45°/0°/90°/45°/90$_{2°}$/−45°/0°/90°/45°/90$_{2°}$/−45°/0°/45°/90°/0°/−45$_{2°}$/45°].

5. The variable thickness rim structure according to claim 4, wherein:

the axially inboard ply block comprises 36 layers in total;

various layers of the axially inboard ply block are paved in the direction from the radially outer side to the radially inner side of the rim structure;

the axially inboard ply block comprises a first axially inboard ply area, a second axially inboard ply area, and a third axially inboard ply area that are arranged continuously in sequence;

a second layer, a sixth layer, an eighth layer, a eleventh layer, a thirteenth layer, a sixteenth layer, a eighteenth layer, a twenty-first layer, a twenty-third layer, a twenty-sixth layer, a twenty-eighth layer, a thirty-first layer, a thirty-third layer, and a thirty-fifth layer of the first axially inboard ply area are first axially inboard differential layers; a starting end of each of the first axially inboard differential layers is the first end of the axially inboard ply block; lengths of the first axially inboard differential layers are increased layer by layer from radially outer side to radially inner side; an value of adjacent two of the first axially inboard differential layers is ranged from 1.5 to 3 mm; and a termination end of the thirty-fifth layer of the first axially inboard ply area is close to a first end of the second axially inboard ply area;

a fourth layer, a ninth layer, a fourteenth layer, a nineteenth layer, a twenty-fourth layer, and a twenty-ninth layer of the third axially inboard ply area are second axially inboard differential layers; a starting end of each of the second axially inboard differential layers is the second end of the axially inboard ply block; lengths of the second axially inboard differential layers are increased layer by layer from radially outer side to radially inner side; an increment value of adjacent two of the second axially inboard differential layers is ranged from 1.5 to 3 mm; a termination end of the twenty-ninth layer of the third axially inboard ply area is close to a second end of the second axially inboard ply area;

when each of the first and second axially inboard differential layers is paved, a next layer is paved in an overlapping manner with a second overlapping angle less than tangent (1/10), the second overlapping angle is an included angle between corresponding one of the first and second axially inboard differential layers and the next layer;

remaining layers, except the first and second axially inboard differential layers of the axially inboard ply block, are shared layers and are uniformly covered and paved in the first axially inboard ply area, the second axially inboard ply area, and the third axially inboard ply area; and a second glass fiber layer is further paved on a radially outer side of a thirty-sixth layer of the axially inboard ply block.

6. The variable thickness rim structure according to claim 5, wherein third angles of the various layers of the axially inboard ply block with respect to the axis direction of the variable thickness rim structure are as follows respectively from radially outer side to radially inner side: [45°/90°/0°/−45°/90°/45°/90°/−45°/0°/45°/90°/−45°/0°/90°/45°/90°/−45°/90°/45°/0°/−45°/90°/45°/90°/−45°/0°/45°/−45°/90°/45°].

7. The variable thickness rim structure according to claim 6, wherein:

the filling ply block comprises 15 layers with lengths that vary stepwise;

various layers of the filling ply block are paved in the direction from the radially outer side to the radially inner side of the rim structure; and fourth angles of the various layers of the filling ply block with respect to the axis direction of the variable thickness rim structure are as follows respectively: [45°/90°/−45°/0°/45°/90°/0°/−45°].

8. The variable thickness rim structure according to claim 7, wherein:

a first layer of the radially outer ply block and the twenty-fifth layer of the axially outboard ply are paved by a same first layer piece, and a second layer of the radially outer ply block and a twenty-fourth layer of the axially outboard ply block are paved by a same second layer piece;

the first layer of the radially outer ply block and the thirty-sixth layer of the axially inboard ply block are paved by a same third layer piece, and the second layer of the radially outer ply block and the thirty-fifth layer of the axially inboard ply block are paved by a same fourth layer piece; and the twenty-fifth layer of the axially outboard ply block and the thirty-sixth layer of the axially inboard ply block are paved by a same fifth layer piece, and the twenty-fourth layer of the axially outboard ply block and the thirty-fifth layer of the axially inboard ply block are paved by a same sixth layer piece.

9. A ply design method for a variable thickness rim structure made of carbon fiber composite, comprising:

determining overall thickness of the rim structure, under an assumption that the rim structure is an equal thickness structure;

performing free dimension optimization on an assembled wheel comprising the rim structure based on fatigue and impact conditions to obtain variable thickness areas and thicknesses of the variable thickness areas; and paving layers in a manner of layer intercalating and with variable thickness and optimizing thicknesses and angles of layers of the variable thickness areas.

10. The ply design method according to claim 9, wherein:
a formula for determining the overall thickness $t_c$ is as follows:

$$t_c = t_a \sqrt{\sigma_{sa}/\sigma_{sc}},$$

wherein: $t_a$ is thickness of an aluminum alloy wheel rim cast according to same size as that of the rim structure, $\sigma_{sa}$ is tensile strength of aluminum alloy, and $\sigma_{sc}$ is longitudinal tensile strength of a carbon fiber composite;

when paving is performed in the manner of layer intercalating and with variable thickness, a layer adding strategy of intercalating differential layers is adopted in an area needing to be thickened of the rim structure, and a layer reducing strategy of reducing shared layers is adopted in an area needing to be thinned of the rim structure, and angles of layers of the rim structure with respect to an axis direction of the rim structure meet requirements that: a number of layers at +45° is equal to a number of layers at −45°; proportions of layers at +45°, −45°, 0°, and 90° among total number of layers are not less than 10%; a number of continuous layers at a same angle is no more than 4; and when the thicknesses and angles of layers in the variable thickness areas are optimized, so that the angles of layers of the rim structure with respect to an axis direction of the rim structure meet the requirements: the number of layers at +45° is equal to the number of layers at −45°; the proportions of layers at +45°, −45°, 0°, and 90° among total number of layers are not less than 10%; the number of the continuous layers at the same angle is no more than 4.

* * * * *